US009673745B2

(12) United States Patent
Takayama et al.

(10) Patent No.: US 9,673,745 B2
(45) Date of Patent: Jun. 6, 2017

(54) SERVOMOTOR CONTROL SYSTEM INCLUDING A BUFFER SERVOMOTOR WITH A PLURALITY OF WINDINGS

(71) Applicant: FANUC CORPORATION, Yamanashi (JP)

(72) Inventors: Kenichi Takayama, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/828,664

(22) Filed: Aug. 18, 2015

(65) Prior Publication Data

US 2016/0056749 A1 Feb. 25, 2016

(30) Foreign Application Priority Data

Aug. 19, 2014 (JP) ................................ 2014-166920

(51) Int. Cl.
*G05B 11/32* (2006.01)
*H02P 27/06* (2006.01)
(Continued)

(52) U.S. Cl.
CPC ............... *H02P 27/06* (2013.01); *H02P 5/74* (2013.01); *H02P 25/22* (2013.01)

(58) Field of Classification Search
CPC ....... H02K 11/33; H02K 11/044; H02P 27/06; H02P 25/22
(Continued)

(56) References Cited

U.S. PATENT DOCUMENTS 3,838,321 A * 9/1974 Damm ...................... H02P 5/51
318/66
5,742,143 A * 4/1998 Katagiri ............... G05B 19/234
318/625
(Continued)

FOREIGN PATENT DOCUMENTS

JP 2010221221 A 10/2010
JP 2013071123 A 4/2013

OTHER PUBLICATIONS

English Abstract and Machine Translation for Japanese Publication No. 2010-221221 A, published Oct. 7, 2010, 27 pgs.
English Abstract and Machine Translation for Japanese Publication No. 2013-071123 A, published Apr. 22, 2013, 17 pgs.

*Primary Examiner* — Bentsu Ro
*Assistant Examiner* — Thai Dinh
(74) *Attorney, Agent, or Firm* — Fredrikson & Byron, P.A.

(57) ABSTRACT

A servomotor control system of the present invention includes: a multiple number of first servomotors for driving axes in a machine tool or others; a multiple number of converters for converting AC voltage into DC voltage; a multiple number of first inverters for converting DC voltage into AC voltage; second servomotors for rotating inertial bodies; a multiple number of second inverters for converting DC voltage into AC voltage; and a servomotor control unit for controlling the multiple first servomotors and the second servomotors, and is constructed such that the number of the second servomotors is less than that of the multiple second inverters, and at least one of the second servomotors includes a multiple number of independent windings, and at least part of the multiple second inverters are connected to the multiple independent windings provided for one of the second servomotors.

2 Claims, 6 Drawing Sheets

(51) Int. Cl.
*H02P 25/22* (2006.01)
*H02P 5/74* (2006.01)

(58) Field of Classification Search
USPC .... 318/625, 678, 34, 38, 122, 123, 722, 496
See application file for complete search history.

(56) References Cited

U.S. PATENT DOCUMENTS

| | | | |
|---|---|---|---|
| 8,022,658 B2* | 9/2011 | Ide | G01R 31/1227 318/802 |
| 8,541,962 B2* | 9/2013 | Sato | G01R 31/346 318/49 |
| 8,639,404 B2* | 1/2014 | Sugiyama | B60K 6/12 701/22 |
| 2003/0222615 A1* | 12/2003 | Aono | H02P 5/74 318/625 |
| 2004/0257029 A1* | 12/2004 | Sakamoto | G01R 31/343 318/802 |
| 2005/0151658 A1* | 7/2005 | Kono | B60L 3/0023 340/647 |
| 2006/0038524 A1* | 2/2006 | Okamoto | H02P 5/74 318/625 |
| 2008/0094022 A1* | 4/2008 | Horikoshi | H02P 29/00 318/802 |
| 2011/0181222 A1* | 7/2011 | Nagase | H02P 5/68 318/430 |

* cited by examiner

PRIOR ART

SERVOMOTOR CONTROL SYSTEM INCLUDING A BUFFER SERVOMOTOR WITH A PLURALITY OF WINDINGS

CROSS-REFERENCE TO RELATED APPLICATIONS

This application is a new U.S. patent application that claims benefit of JP 2014-166920, filed on Aug. 19, 2014, the entire content of JP 2014-166920 is hereby incorporated by reference.

FIELD OF THE INVENTION

The present invention relates to a servomotor control system, and in particular relates to a servomotor control system including a buffer motor with a plurality of windings.

BACKGROUND OF THE INVENTION

In large-scale machine tools and industrial machines, there are cases where a plurality of servomotors are used to drive axes. FIG. 1 shows a configuration of a conventional servomotor control system. FIG. 1 shows an example of a servomotor control system in which a plurality of (e.g., (M+N)) drive motors (M1-1, M1-2, . . . , M1-M, . . . , M1-(M+N)) are used as the servomotors for driving axes in a machine tool or the like.

The (M+N) drive motors (M1-1, M1-2, . . . , M1-M, . . . , M1-(M+N)) are driven by respective drive amplifiers (SV1-1, SV1-2, . . . , SV1-M, . . . , SV1-(M+N)) each formed of an inverter circuit. Respectively connected to the (M+N) drive amplifiers (SV1-1, SV1-2, . . . , SV1-M, . . . , SV1-(M+N)) are converter circuits (PS-1, PS-2, . . . , PS-M, . . . , PS-(M+N)). The converter circuits convert alternate current (AC) power from an AC power supply (not shown) into direct current (DC) power to supply the drive amplifiers. The drive amplifiers receive DC power from the converter circuit and convert the DC power into AC power to drive the drive motors.

In the above way, in a large-scale machine tool or industrial machine including a plurality of drive motors, the maximum power consumed by the servomotors is large. Accordingly, when the capacity of the installed power supply becomes insufficient, it is necessary to operate the machine by suppressing the output so as not to consume power or enhance the capacity of the installed power supply.

In order to reduce the power consumption for the drive motors, there has been a proposed technique in which a servomotor (buffer motor) equipped with an inertial body is rotated to store power as rotational energy. In this method, when the drive motors consume power, the buffer motor is retarded to supply energy. On the other hand, when the drive motors regenerate electric power, the buffer motor is accelerated to consume energy. For example, there have been known technologies for a pressing machine using a flywheel as motive power to perform a pressing process in which in order to save energy, the flywheel is accelerated and decelerated in accordance with the power consumed at the servomotor axes (Japanese Patent Application Laid-open 2013-71123 (JP 2013-71123 A) and Japanese Patent Application Laid-open 2010-221221 (JP 2010-221221 A)

FIG. 2 shows a configurational diagram of a conventional servomotor control system equipped with buffer motors. This system is the same as that in FIG. 1 in that (M+N) drive motors (M1-1, M1-2, . . . , M1-M, . . . , M1-(M+N)), (M+N) drive amplifiers (SV1-1, SV1-2, . . . , SV1-M, . . . , SV1-(M+N)) and (M+N) converter circuits (PS-1, PS-2, . . . , PS-M, . . . , PS-(M+N)) are provided. The servomotor control system in FIG. 2 includes, in addition to the components shown in FIG. 1, (M+N) buffer motors (M2-1, M2-2, . . . , M2-M, M2-(M+N)) respectively having inertial bodies (IS-1, IS-2, . . . , IS-M, . . . , IS-(M+N)). The (M+N) buffer motors (M2-1, M2-2, . . . , M2-M, . . . , M2-(M+N)) are driven by buffer amplifiers (SV2-1, SV2-2, . . . , SV2-M, . . . , SV2-(M+N)), respectively. The (N+M) buffer amplifiers (SV2-1, SV2-2, . . . , SV2-M, . . . , SV2-(M+N)) are respectively connected to the converter circuits (PS-1, PS-2, . . . , PS-M, . . . , PS-(M+N)). The converter circuit converts AC power from an AC power supply (not shown) into DC power to supply the buffer amplifier. The buffer amplifier receives DC power from the converter circuit and converts the DC power into AC power to drive the buffer motor.

This method makes it possible to reduce the capacity of the installed power supply and the capacity of the converter circuits compared to the case where no buffer motors are used.

However, in the case where there are plural converter circuits for supplying power to drive motors as shown in FIG. 2, plural buffer motors are needed or it is necessary to replace the plural buffer motors, plural buffer amplifiers and plural converter circuits with single integrated units. FIG. 3 shows an example of a servomotor control system in which plural buffer motors, plural buffer amplifiers and plural converter circuits are integrated into respective units. This system includes (M+N) drive motors (M1-1, M1-2, . . . , M1-M, . . . , M1-(M+N)) and (M+N) drive amplifiers (SV1-1, SV1-2, . . . , SV1-M, . . . , SV1-(M+N)), whereas a single converter circuit PS, buffer amplifier SV2 and buffer motor M2 are provided alone. Further, the buffer amplifier SV2 and buffer motor M2 are connected by a single lead wire.

When, as shown in FIG. 2, as many buffer motors as the plural drive motors are used, there is a problem that the number of buffer motors increases with increase of drive motors. On the other hand, when, as shown in FIG. 3, plural buffer motors, plural buffer amplifiers, and plural converter circuits are integrated into single units, a high-capacity converter circuit as well as a large-current inverter circuit is needed to drive the buffer motor. Due to the small number of high-capacity inverter circuits and converter circuits produced, the costs for these is high compared to inverter circuits and converter circuits of general capacities, bringing about a disadvantage.

It is therefore an object of the present invention to provide a servomotor control system that includes a plurality of drive motors and a plurality of inverter circuits for driving the drive motors and that does not use any dedicated high-capacity inverter circuits for driving buffer motors and converter circuits.

SUMMARY OF THE INVENTION

The servomotor control system according to one embodiment of the present invention is a control system for servomotors for driving axes in an industrial machine or machine tool, comprising: a plurality of first servomotors for driving axes; a plurality of converters for converting AC voltage into DC voltage; a plurality of first inverters that receive DC voltage from the converters and convert the DC voltage into AC voltage to drive the plural first servomotors and also convert the regenerated AC power from the first servomotors into DC power; second servomotors for rotating inertial bodies; a plurality of second inverters that receive DC voltage from the converter and convert the DC voltage into AC voltage to drive the second servomotors and also convert the regenerated AC power from the second servomotors into DC power; and, a servomotor control unit for controlling the plural first servomotors and the second servomotors, wherein the number of the second servomotors is less than that of the plural second inverters, and wherein at least one of the second servomotors includes a plurality of independent windings, and at least part of the plural second inverters are connected to the plural independent windings provided for one of the second servomotors.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
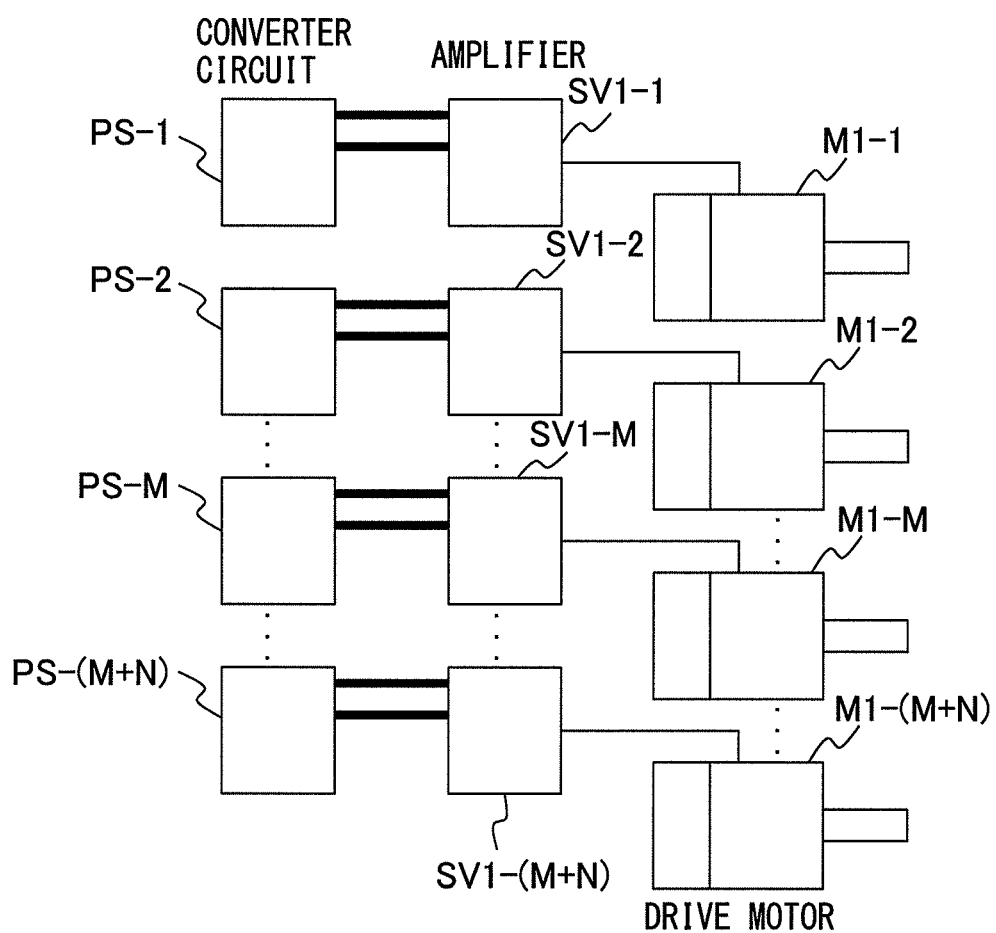
FIG. 1 is a configurational diagram of a conventional servomotor control system including a plurality of drive motors.
Figure 2:
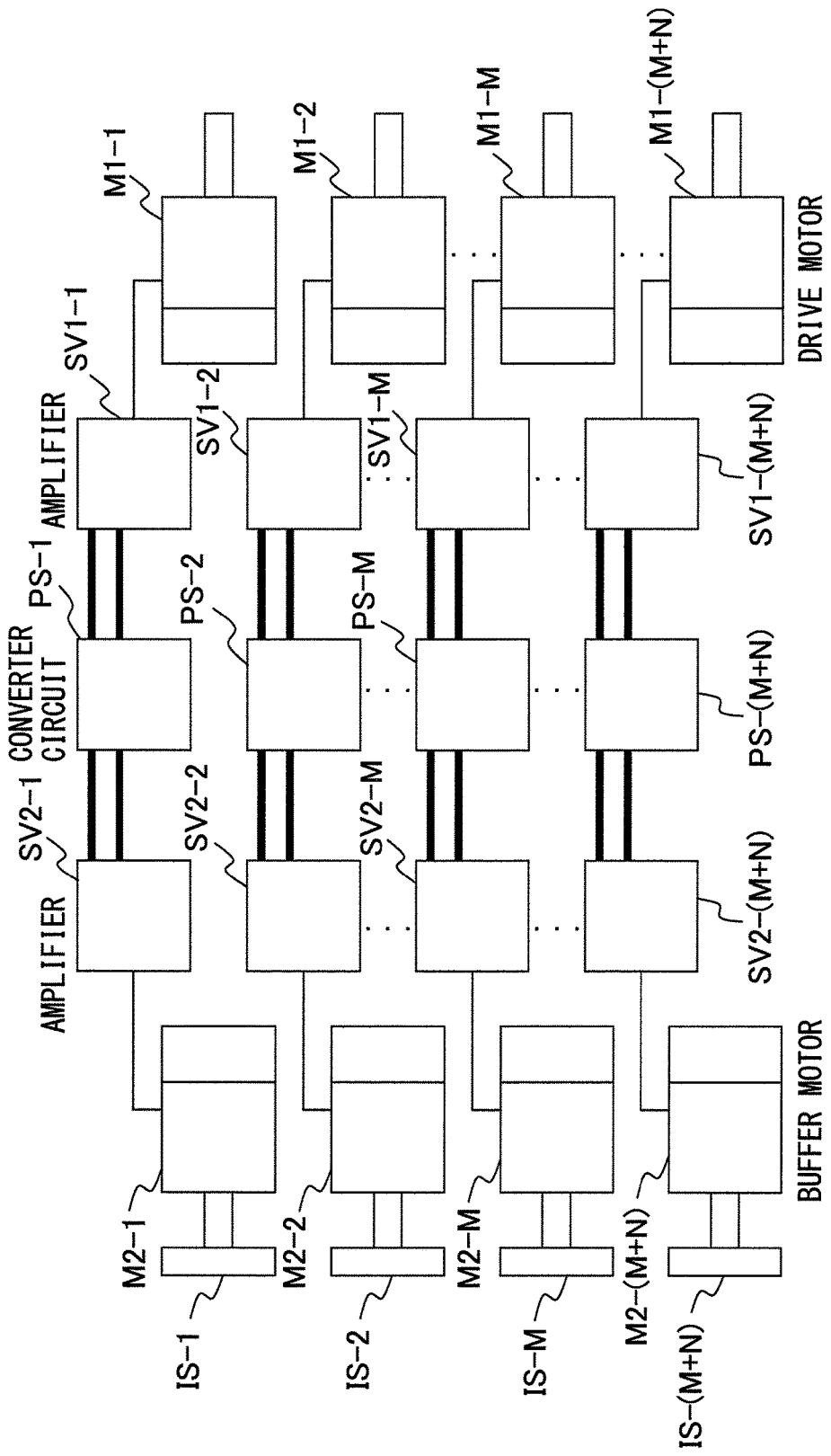
FIG. 2 is a configurational diagram of a conventional servomotor control system including a plurality of drive motors and a plurality of buffer motors.
Figure 3:
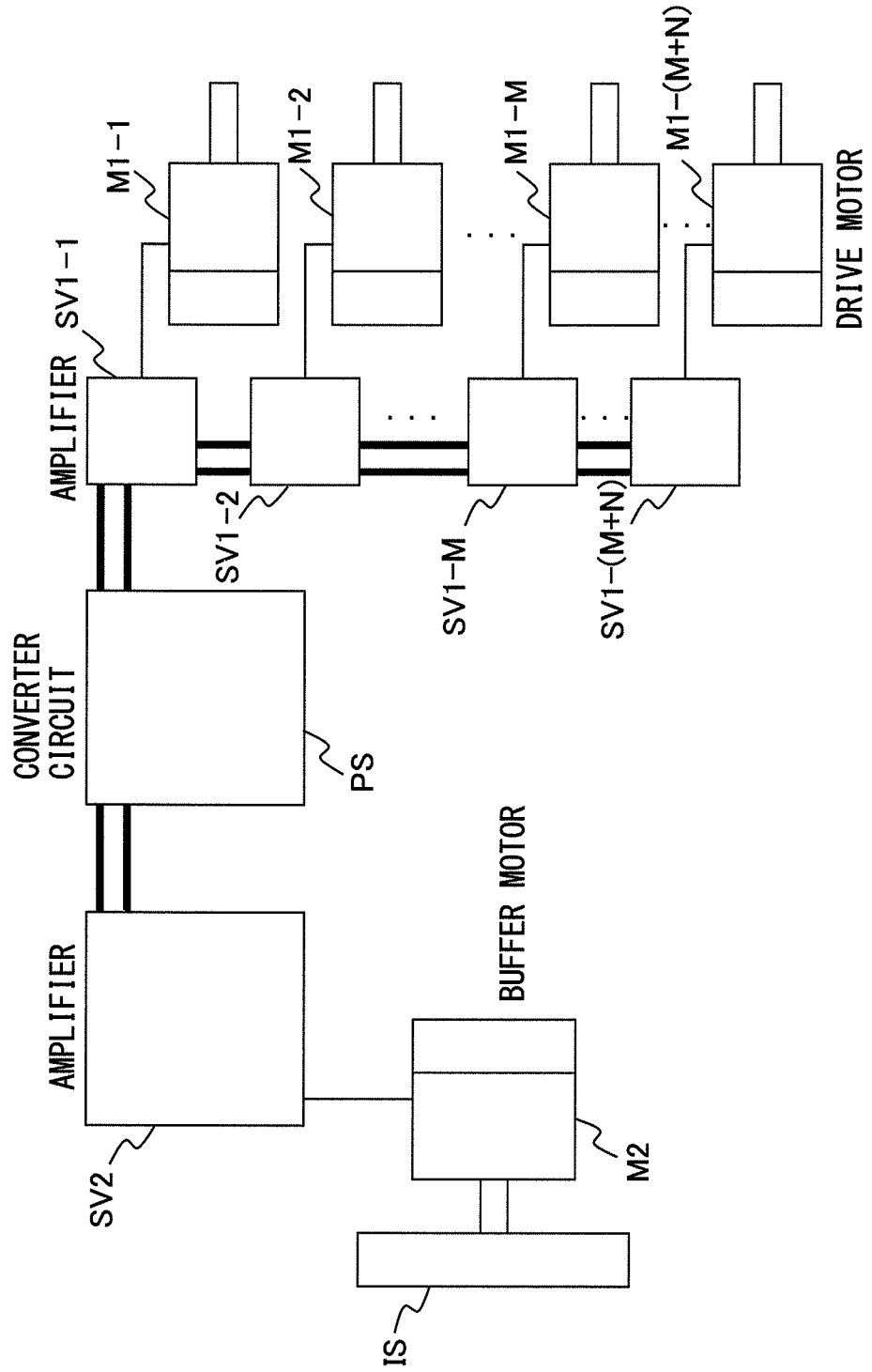
FIG. 3 is a configurational diagram of a conventional servomotor control system including a plurality of drive motors with an integrated single converter circuit, buffer amplifier and buffer motor.

Referring to the drawings, servomotor control systems according to the present invention will be described. However, it should be noted that the technical scope of the present invention is not limited by the embodied mode of these but embraces the inventions defined by the claims and their equivalence.

First Embodiment

Figure 4:
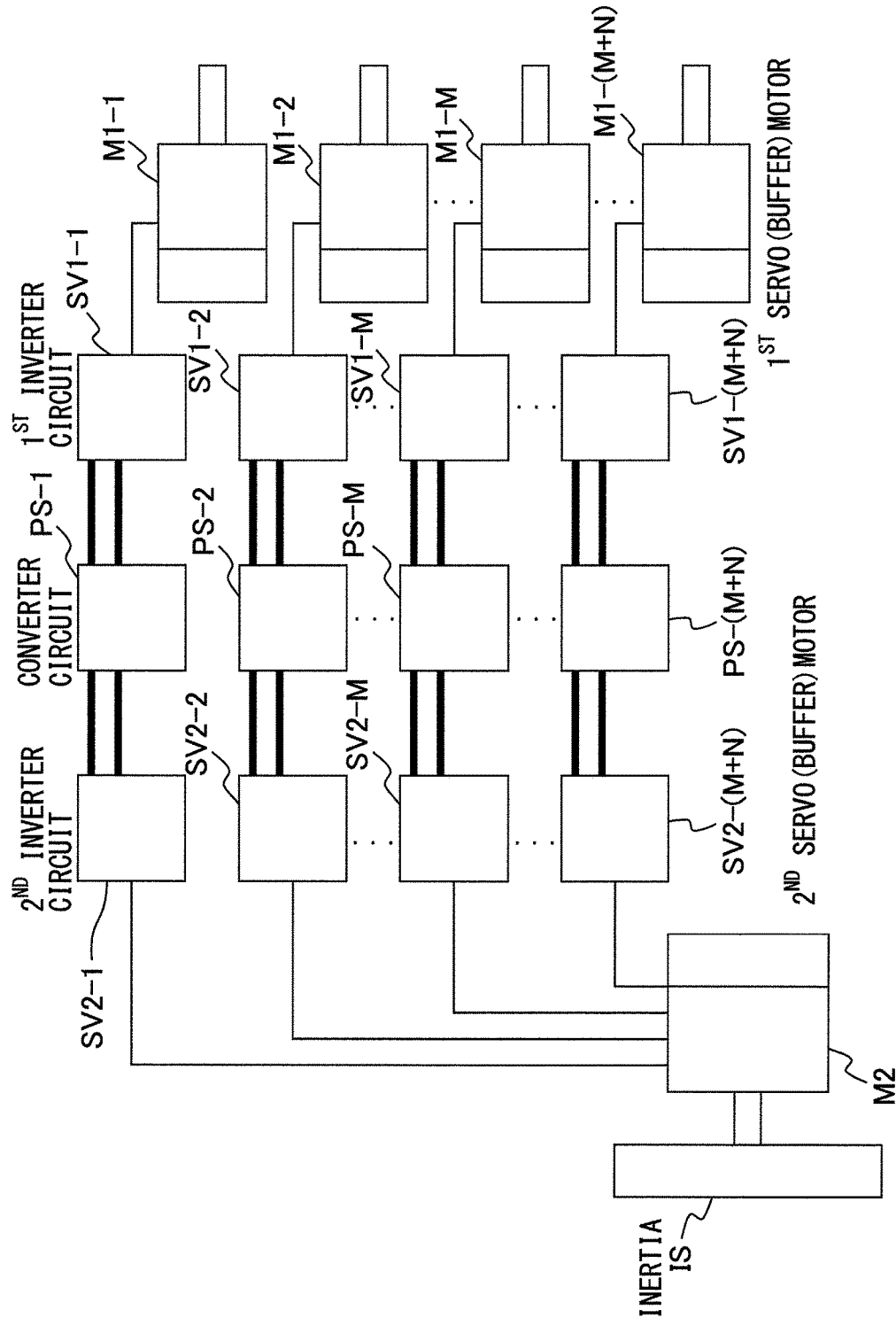
FIG. 4 is a configurational diagram of a servomotor control system according to a first embodiment of the present invention.

A servomotor control system according to a first embodiment of the present invention will be described using the drawings. FIG. 4 is a configurational diagram showing a servomotor control system according to the first embodiment of the present invention. The servomotor control system according to the first embodiment of the present invention is a control system for servomotors for driving axes in an industrial machine or machine tool, including: a plurality of first servomotors for driving the axes; a plurality of converters for converting alternate current (AC) voltage into direct current (DC) voltage; a plurality of first inverters that receive DC voltage from the converters and convert the DC voltage into AC voltage to drive the first servomotors and also convert the regenerated AC power from the first servomotors into DC power; second servomotors for rotating inertial bodies; a plurality of second inverters that receive DC voltage from the converters and convert the DC voltage into AC voltage to drive the second servomotors and also convert the regenerated AC power from the second servomotors into DC power; and a servomotor control unit for controlling the multiple first servomotors and second servomotors, and wherein the number of the second servomotors are less than that of the multiple second inverters, and wherein at least one of the second servomotors includes a plurality of independent windings, and at least part of the multiple second inverters are connected to the multiple independent windings provided for one second motor.

Next, the servomotor control system according to the first embodiment of the present invention will be described in detail. As shown in FIG. 4, the multiple first servomotors (M1-1, M1-2, . . . , M1-M, . . . , M1-(M+N)) are, for example M+N (M+N≥2) drive motors to drive the axes in an industrial machine or machine tool.

The plural converters (PS-1, PS-2, . . . , PS-M, . . . , PS-(M+N)) convert AC voltage from an unillustrated AC power supply into DC voltage. As shown in FIG. 4, in the servomotor control system according to the first embodiment, as many converters as the first servomotors, i.e., (M+N) converters are provided.

The plural first inverters (SV1-1, SV1-2, . . . , SV1-M, . . . , SV1-(M+N)) are amplifiers for driving the drive motors (first servomotors), and receive DC voltage from the plural converters and converts the DC voltage into AC voltage for driving the plural first servomotors and also convert AC power regenerated from plural first servomotors into DC power. Also with regard to the first inverters, as many inverters as the first servomotors, i.e., (M+N) inverters are provided.

A second servomotor M2 is a buffer motor to rotate an inertia (inertial body) IS. Provision and rotation of the second servomotor with the inertia (inertial body) IS makes it possible to store rotational energy. Further, when the drive motors (first servomotors) are consuming power, the buffer motor (second servomotor) is retarded to supply energy. On the other hand, when the drive motors (first servomotors) regenerate power, the buffer motor (second servomotor) is accelerated to consume energy. In this way, it is possible to reduce the electric power necessary for driving motors.

Plural (e.g., (M+N)) second inverters (SV2-1, SV2-2, . . . , SV2-M, . . . , SV2-(M+N)) are amplifiers for driving the buffer motor, i.e., the second servomotor M2, and receive DC voltage from the plural converters (PS-1, PS-2, . . . , PS-M, . . . , PS-(M+N)) and converts the DC voltage into AC voltage for driving the second servomotor M2 and also convert AC power regenerated from the second servomotor M2 into DC power.

The servomotor control unit (not shown) controls the plural first servomotors (M1-1, M1-2, . . . , M1-M, . . . , M1-(M+N)) and the second servomotor M2. It is preferable that the servomotor control unit is adapted to control the second servomotor M2 so as to reduce the maximum electric power of the plural first servomotors.

Figure 5A:
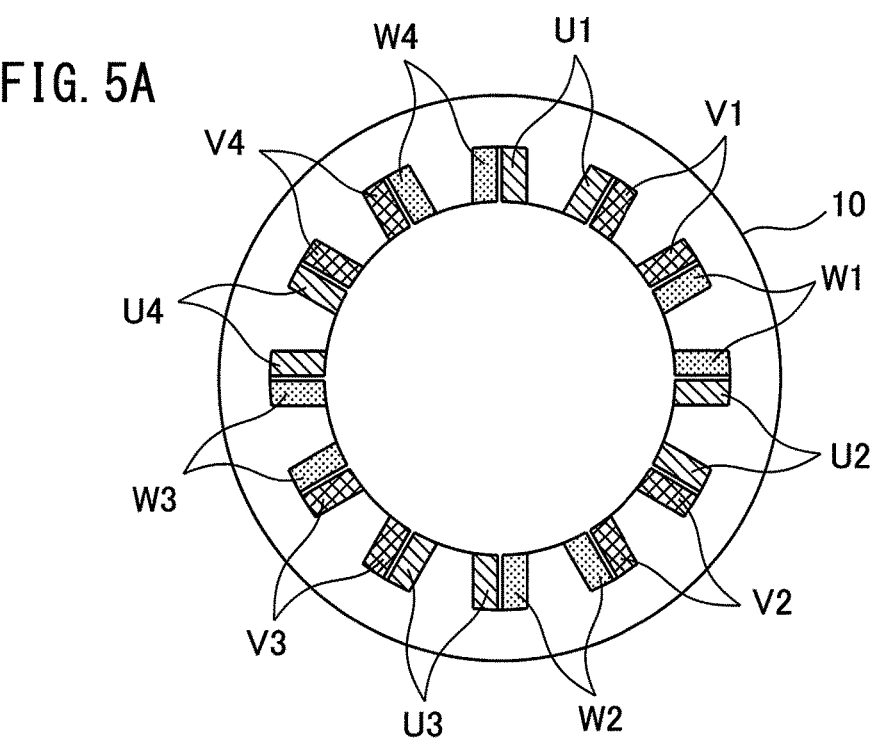
FIG. 5A is a diagram of a structure of windings in a second servomotor.
Figure 5B:
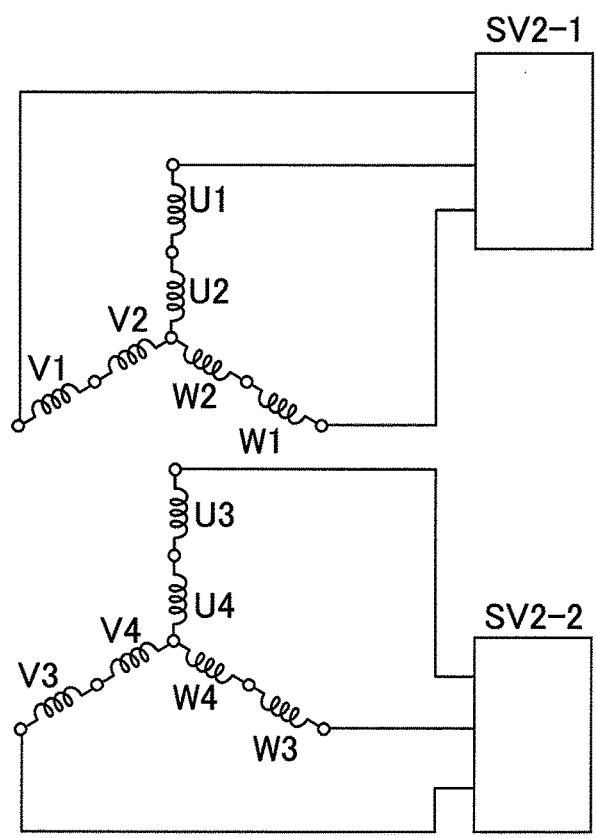
FIG. 5B is a diagram showing connections between the windings of the second servomotor and second inverters.

The servomotor control system according to the first embodiment of the present invention is characterized in that the number of the second servomotors M2 are less than the plural number (e.g., (M+N)) of the second inverters, and at least one of the second servomotors M2 includes a plurality of independent windings, and at least part of the plural second inverters are connected to the plural independent windings provided for the one second motor. FIG. 5A shows a structure of windings in the second servomotor M2 while FIG. 5B shows an example of connections between the windings of the second servomotor M2 and the second inverters. FIG. 5A is a sectional view of the second servomotor M2, showing a stator 10 in which a plurality of windings (U1, U2, V1, V2, W1, W2, U3, U4, V3, V4, W3, W4) are arranged. The plural windings (U1, U2, V1, V2, W1, W2, U3, U4, V3, V4, W3, W4) are divided into two groups of windings, the first group (U1, U2, V1, V2, W1, W2) and the second group (U3, U4, V3, V4, W3, W4). FIG. 5B shows an example of connections between the plural windings shown in FIG. 5A and plural second inverters SV2-1 and SV2-2. As shown in FIG. 5B, of the above-mentioned plural windings, the first group of windings (U1, U2, V1, V2, W1, W2) are connected to one second inverter SV2-1, whereas the second group of windings (U3, U4, V3, V4, W3, W4) are connected to the other second inverter SV2-2. Though the example herein shows a case where a single second servomotor is connected to two second inverters, the embodiment should not be limited to this. A single second servomotor may be connected to three or more second inverters. Also, FIG. 4 shows a case where a single second servomotor M2 is provided, but plural second servomotors may be disposed, not limited to the case. However, when for example M second servomotors are provided, the number M of second servomotors M2 is smaller than the number (M+N) of the plural second inverters (M<(M+N)).

Further, the example shown in FIG. 4 shows a case where the single second servomotor M2 has the same number of independent windings as (M+N), the number of the second inverters. However, the embodiment should not be limited to this. That is, when M second servomotors (M2-1, M2-2, ..., M2-M) are provided, at least one these servomotors may and should have a plurality of windings while the remaining (M-1) servomotors do not need to include independent windings.

When, for example, of M second servomotors (M2-1, M2-2, ..., M2-M), one second servomotor M2-1 has two independent windings, the other (M-1) second servomotors (M2-2, ..., M2-M) do not need to have plural independent windings. In this case, the single second servomotor M2-1 includes two independent windings, so two second inverters SV2-1 and SV2-2 are connected to two respective independent windings of the second servomotor M2-1, for example.

Similarly, when for example, of M second servomotors (M2-1, M2-2, ..., M2-M), two second servomotors M2-1 and M2-2 each have two independent windings, the other (M-2) second servomotors (M2-3, ..., M2-M) do not need to have plural independent windings.

Therefore, as long as, at least, one of the second servomotors includes independent windings, it is possible to reduce the number of second servomotors as buffer motors whiles keeping up the number of second inverters. Accordingly, this configuration contributes to producing the effect of making it unnecessary to use dedicated large capacity second inverters and converters.

The Second Embodiment

Figure 6:
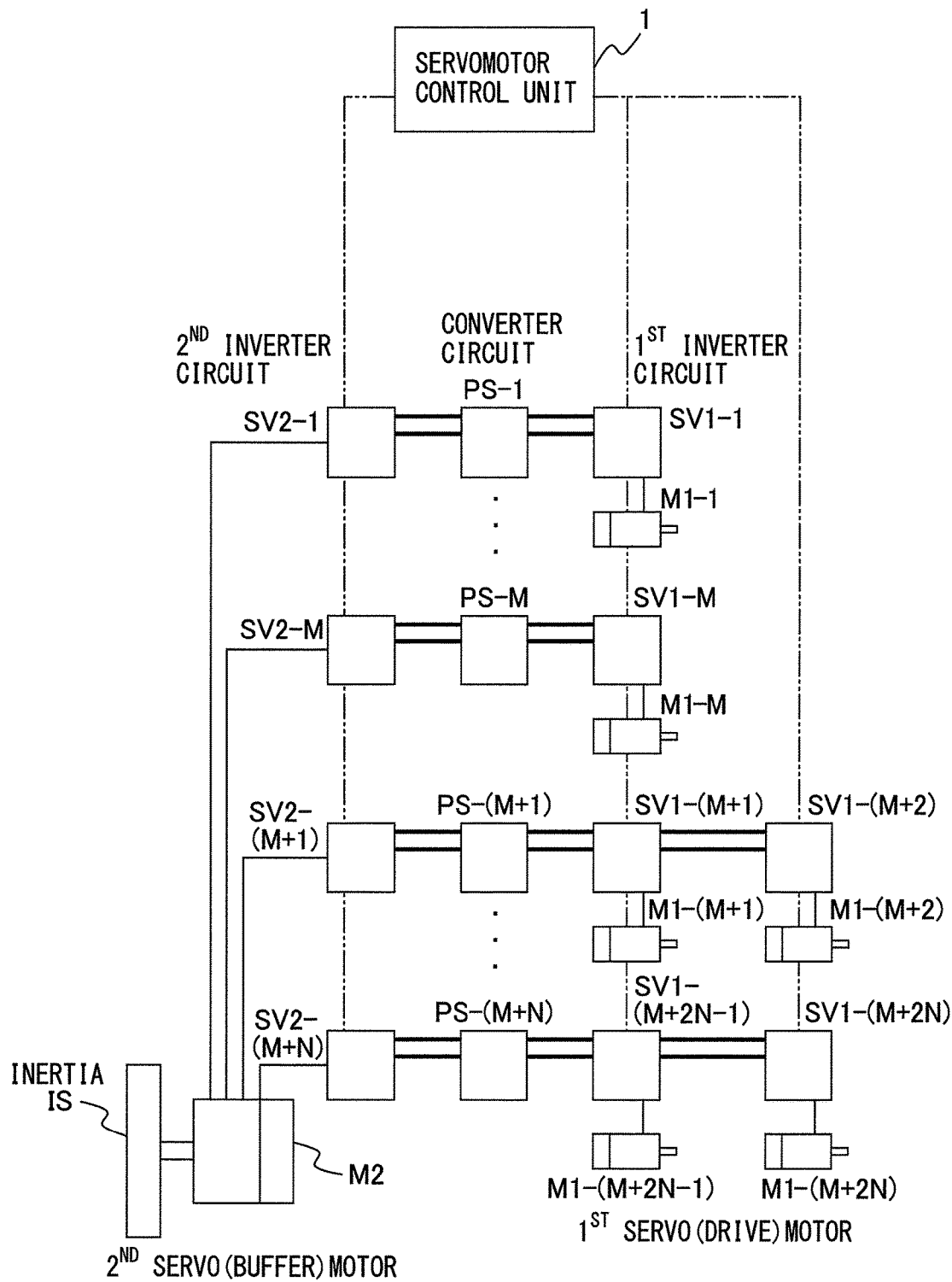
FIG. 6 is a configurational diagram of a servomotor control system according to a second embodiment of the present invention.

Next, a servomotor control system according to a second embodiment of the present invention will be described with reference to the drawings. FIG. 6 is a configurational diagram of a servomotor control system according to the second embodiment of the present invention. The servomotor control system according to the second embodiment of the present invention is different from the servomotor control system according to the first embodiment in that the number of plural first servomotors as drive motors is greater than the number of converters. The other configurations of the servomotor control system according to the second embodiment are the same as those of the servomotor control system according to the first embodiment, so a detailed description is omitted.

As shown in FIG. 6, plural, specifically, (M+2N) first servomotors (M1-1, ..., M1-M, M1-(M+1), M1-(M+2), ..., M1-(M+2N-1), M1-(M+2N) are provided as the driving motors for the servomotor control system according to the second embodiment, and also the same number, i.e., (M+2N), of first inverters (SV1-1, ..., SV1-M, SV1-(M+1), SV1-(M+2), ..., SV1-(M+2N-1), SV1-(M+2N)) as that of the plural first servomotors are provided. On the other hand, plural (M+N) converters (PS-1, ..., PS-M, PS-(M+1), ..., PS-(M+N)), which are less than the first servomotors and first inverters, are provided. That is, at least part of the plural converters, are connected to plural first inverters so as to drive plural first servomotors. For example, as shown in FIG. 6 the converter (PS-(M+1)) is connected to two first inverters (SV1-(M+1)) and (SV1-(M+2)) and the converter (PS-(M+N)) are connected to two first inverters (SV1-(M+2N-1)) and (SV1-(M+2N)).

Further, as shown in FIG. 6, the same number of second inverters as that of the converters, i.e., (M+N) second inverters (SV2-1, ..., SV2-M, SV2-(M+1), ..., SV2-(M+N)) for driving a second servomotor M2 as a buffer motor are provided. Further, the example shown in FIG. 6 shows a case where a single second servomotor M2 alone is provided, but the number of second servomotors is not limited to this, as in the first embodiment.

The servomotor control unit 1 is connected to plural first inverters (SV1-1, ..., SV1-M, SV1-(M+1), SV1-(M+2), ..., SV1-(M+2N-1), SV1-(M+2N)) and plural second inverters (SV2-1, ..., SV2-M, SV2-(M+1), ..., SV2-(M+N)) to control first servomotors (M1-1, ... M1-M, M1-(M+1), M1-(M+2), ..., M1-(M+2N-1), M1-(M+2N), and plural independent windings provided for the second servomotor M2, respectively.

In the servomotor control system according to the second embodiment, the numbers of the first inverters, converters and second inverters satisfy the following conditional expression:

The number of first inverters for drive motors (first servomotors)
≥ the number of converters
≥ the number of second inverters for buffer motors (second servomotors)
≥2.

As described above, according to the servomotor control system of the second embodiment of the present invention, even if the drive motors equal to or greater in number than the converters are provided, it is possible to reduce the number of buffer motors having inertia without reducing the number of the second inverters which is the same number as that of the converters. Accordingly, this configuration makes it possible to not have to use dedicated large capacity second inverters and converters.

As has been described heretofore, according to the present invention, since motors including a plurality of windings which each are driven by different inverter circuits that are connected to individual converter circuits, are used as buffer motors, it is possible to produce the effect of making it unnecessary to use dedicated large capacity converter circuits and inverter circuits for driving buffer motors.

What is claimed is:
1. A control system for servomotors for driving axes in an industrial machine or machine tool, comprising:

a plurality of first servomotors configured to drive axes;
a plurality of converters configured to convert alternate current (AC) voltage into direct current (DC) voltage;
a plurality of first inverters configured to receive DC voltage from the converters and convert the DC voltage into AC voltage to drive the plural first servomotors and also convert the regenerated AC power from the first servomotors into DC power;
second servomotors configured to rotate inertial bodies;
a plurality of second inverters configured to receive DC voltage from the converter and convert the DC voltage into AC voltage to drive the second servomotors and also convert the regenerated AC power from the second servomotors into DC power; and
a servomotor control unit configured to control the plural first servomotors and the second servomotors,
wherein the number of the second servomotors is less than that of the plural second inverters, and
wherein at least one of the second servomotors includes a plurality of independent windings, and at least part of the plural second inverters are connected to the plural independent windings provided for one of the second servomotors.

2. The servomotor control system according to claim 1, wherein the servomotor control unit controls the second servomotors so as to reduce the maximum power of the plural first servomotors.

\* \* \* \* \*